United States Patent Office 2,773,001
Patented Dec. 4, 1956

2,773,001
METHOD OF PREPARING CITRATE ION-DERIVED L-GLUTAMIC ACID

Carl V. Smythe, Moorestown, N. J., and Hsing T. Huang, Elkins Park, Pa., assignors to Rohm & Haas Company, Philadelphia, Pa., a corporation of Delaware No Drawing. Application May 27, 1954,
Serial No. 432,907

8 Claims. (Cl. 195—30)

This invention concerns a process for preparing L-glutamic acid and/or derivatives thereof. The process comprises treating an aqueous solution containing citrate ions and ammonium ions in an amount at least molecularly proportional to the citrate ions with a lysate of a yeast, the lysate of which oxidizes citric and glutamic acids. There are various yeasts which can be identified by this test, such as *Torula cremoris, Torulopsis utilis, Saccharomyces fragilis*, etc. A particularly effective yeast is *Saccharomyces cerevisiae*. The solution is subjected to the action of the enzyme system developed in such a yeast until substantial conversion of citrate to glutamate has occurred. The glutamate is then recovered from the reaction mixture.

It has been reported that amination of α-ketoglutaric acid with aspartic acid can be accompilshed with the aid of a transaminase. This reaction requires the previous production of an aminocarboxylic acid. It is also known that the amino group of glutamic acid can be transferred by enzymatic action. The findings of the prior art, however, are inadequate for predicting the enzymatic preparation of L-glutamic acid from common substrates.

According to the process of this invention L-glutamic acid is prepared by treating an aqueous solution containing citrate and ammonium ions at a pH of 6 to 8.5, best of 7 to 8, with a lysed yeast between 20° and 40° C. and recovering glutamate from the treated solution. While the conversion to glutamate occurs under both aerobic and anaerobic conditions, the former condition is preferred, since yields are better. Addition of trace elements, including iron, magnesium and manganese, help in the reactions involved, but such addition is not entirely essential as frequently traces are present in the yeasts. Such additions are desirable as the citrate concentration is increased into the upper portion of the range of concentrations which may be used.

The solution acted upon by the yeast should contain between 0.01 and about 0.2 mole of citrate, preferably from about 0.05 to about 0.15 mole. It should also contain ammonium ions in an amount at least molecularly proportional to the citrate contents with observance of the required pH level. Phosphate buffers may be used, if desired. If desired, a soluble salt of citric acid may be used and an ammonium salt, such as ammonium chloride or sulfate added to supply the ammonium ions. Also, citric acid may be dissolved as a starting material, ammonia added, and an alkali metal base, such as sodium or potassium carbonate or hydroxide used for adjustment of pH. A particularly convenient combination or salt is that of two ammonium ions and one sodium ion per citrate molecule.

To the aqueous solution containing ammonium and citrate ions there is added yeast in an effective form in which the enzyme system thereof is freely available. Yeast cells are desirably washed with water and then lysed by conventional methods. The cells may, for example, be ground with an abrasive material, such as sand, desirably after the cells have been dried. They may be subjected to sonic vibrations or they may be treated with an organic solvent such as toluene or ethyl acetate. Yeast which has been treated to render the enzyme system thereof readily available is here defined as a lysed yeast.

Yeast solids in amounts of 5 to 50 mg. are added per ml. of citrate solution. The mixture is agitated at a temperature between 20° and 40° C., preferably between 25° and 35° C., until formation of glutamate has reached a useful level.

This may require 6 to 48 hours. While longer periods of reaction even up to 96 hours can be used, it frequently happens that side reactions begin to occur as a result possibly of contamination or as the result of the difficulty of avoiding all foreign organisms in yeast preparations. During the reaction period agitation either occasionally or continuously is desirable.

When a satisfactory level of glutamate has been reached, extraneous materials including yeast cells are removed and the glutamate recovered. By one method the reaction mixture is adjusted to pH 4 and heated to coagulate protein. It is then filtered. Another convenient method is to add trichloroacetic acid to coagulate protein in the solution and remove insoluble matter by filtering or centrifuging. The filtrate is then extracted as with ethyl ether, to take up trichloroacetic acid. With the pH of the aqueous solution at a value of about 4, the solution is brought in contact with a sulfonic cation exchange resin in hydrogen form, as by passage through a column packed with the resin. The resin is eluted with a normal hydrochloric acid solution. The eluate is evaporated to give a residue which can be recrystallized to give pure L-glutamic acid. The eluate may also be treated with dilute sodium hydroxide solution to form monosodium glutamate, which can be recovered as a solid residue or as crystals. Also, elution may be effected with dilute sodium hydroxide solutions and the eluate is concentrated to give sodium glutamate.

Typical preparations of L-glutamate are shown in the following illustrative examples:

Example 1

A portion of 100 grams of cold yeast cake was mixed with 5 ml. of ethyl acetate at 4° C. and mechanically worked. Addition was made of 2.5 ml. of ethyl acetate and the treated yeast was stored at 4° C. for 16 hours. A thin slurry resulted. There were then measured into a reaction vessel 100 ml. of a 0.1 M phosphate buffer solution (pH 7.0), 12 ml. of one molar ammonium chloride solution, 12 ml. of one molar trisodium citrate solution, one ml. of a solution containing iron and manganese salts and 40 g. of autolysed yeast slurry, containing about 10% solids. The pH of this mixture was adjusted with dilute sodium hydroxide solution to a pH of 7. The reaction vessel was loosely stoppered with cotton and shaken at about 30° C. At intervals 5 ml. portions of mixture were withdrawn, adjusted to pH 4 with hydrochloric acid, heated to cause coagulation, centrifuged, and analyzed for L-glutamate by a microbiological method, in which *Lactobacillus plantarum* was used. The yield of L-glutamate in 24 hours was 82% based on moles of citrate available. Analyses for ammonia uptake indicated a somewhat higher conversion.

Example 2

The above procedure was followed, but in addition a slow stream of nitrogen was passed into the reaction mixture to exclude air. The temperature of the reaction mixture was held at 29° C. At 24 hours the yield of L-glutamate was 44%.

Example 3

The procedure of Example 1 was followed except that twice the above volume of 2 M ammonium chloride solution was used in the mixture. At 23 hours all of the citrate had been converted to L-glutamate.

It was found that the presence of a small amount of nicoinamide (0.5 g. in the above mixture) gave a more rapid conversion or at a given time a more complete conversion.

Example 4

The procedure of Example 1 was followed with use, however, of 0.05 M phosphate buffer solution, the volume being the same. The yield of L-glutamate was about 100% at 24 hours.

Example 5

Fresh bakers yeast (*S. cerevisiae*) was washed well with distilled water and sucked dry on a filter. A suspension was prepared of 40 g. of washed yeast in 60 ml. of 0.2 M sodium phosphate buffer having a pH of 7.0. This suspension held at 6° C. was subjected to ultrasonic vibrations in portions, each of which was placed in an ultrasonic vibrator at 10,000 cycles per second for 15 minutes. The treated suspension was mixed with 60 ml. of 0.2 M diammonium sodium citrate and one ml. of a solution of 1.0 g. of $FeSO_4.7H_2O$ and 1.0 g. of $MnSO_4.4H_2O$ in 20 ml. of water. The pH of the resulting mixture was adjusted to a value of 7.0 with 10 N sodium hydroxide solution and water was added thereto to bring the total volume to 240 ml. The mixture was incubated at 28° C. as described in Example 1. At 25 hours it was found by microbiological analyses for L-glutamic acid that 85% of the citric acid had been converted to L-glutamate. A portion of 200 ml. of the reaction mixture was heated in an autoclave at 120° C. for five minutes. It was cooled, acidified to pH 3.0, and left standing at 0° C. for 16 hours. It was centrifuged and the supernatant liquor was concentrated under low pressure. Crystals formed and were separated. These were shown by microbiological assay to be chiefly L-glutamic acid.

Reaction mixtures from Examples 1-4 were subjected to the following steps for isolation of L-glutamic acid. The mixture was treated with trichloroacetic acid and centrifuged to deproteinize it. The clear liquor was extracted with ether until the pH of the liquor reached a value of 4.0. The thus adjusted aqueous liquor was passed down a column containing a sulfonic cation-exchange resin in hydrogen form. The resin was then eluted with 1 N hydrochloric acid solution. The eluate was evaporated to dryness. The residue was taken up in water and the pH of the resulting solution was adjusted to a level of 3.0 with ammonium hydroxide solution. This solution was concentrated until crystallization of L-glutamic acid was effected. The acid was collected and recrystallized from water. It had a melting point of 187° C. and was identical with an authentic sample of L-glutamic acid as shown by mixed melting point. The specific rotation was $-32°$ in 5 N hydrochloric acid solution, at 25° C., using a 1% solution of the glutamic acid.

We claim:

1. A method for preparing L-glutamic acid which comprises treating with a lysate of a yeast which oxidizes citric and glutamic acids an aqueous solution containing citrate ions as the exclusive carbon atom-yielding starting material and ammonium ions in an amount at least molecularly proportional to the citrate, said solution having a pH of 6 to 8.5, being at a temperature of 20° to 40° C., and having a concentration between 0.01 and about 0.2 molar with respect to citrate, permitting the lysate to act on said solution, whereby at least one decarboxylation occurs and at least one amination takes place, and recovering the resulting citrate derived glutamate content.

2. A method for producing L-glutamic acid which comprises treating under aerobic conditions with autolysed yeast an aqueous solution containing citrate ions as the exclusive carbon atom-yielding starting material and ammonium ions in an amount which is at least molecularly proportional to the citrate, said solution having a pH of 6 to 8.5 and being at a temperature of 20° to 40° C., permitting the yeast to act on said solution, whereby at least one decarboxylation occurs and at least one amination takes place, and recovering the resulting citrate derived glutamate content thereof.

3. A method for preparing L-glutamic acid which comprises treating under aerobic conditions with autolysed yeast an aqueous solution containing 0.05 to about 0.15 mole of citrate ions per liter and ammonium ions in an amount at least molecularly proportional to the said citrate ions, said solution having a pH of 6 to 8.5 and a temperature of 25° to 35° C., permitting the yeast to act on said solution, and recovering the resulting citrate derived glutamate content thereof.

4. The process of claim 2 wherein the yeast has been treated with sonic vibrations.

5. The process of claim 2 wherein the yeast has been lysed with ethyl acetate.

6. A method for preparing L-glutamic acid which comprises treating under aerobic conditions with lysed *Saccharomyces cerevisiae* an aqueous solution containing 0.05 to about 0.15 mole of citrate ions per liter and ammonium ions in an amount at least molecularly proportional to the said citrate ions, said solution having a pH of 6 to 8.5 and a temperature of 25° to 35° C., permitting the yeast to act on said solution, and recovering the resulting citrate derived glutamate content thereof.

7. The process of claim 6 wherein the yeast has been treated with sonic vibrations.

8. The process of claim 6 wherein the yeast has been lysed with ethyl acetate.

References Cited in the file of this patent

Chemical Abstracts, 32:2966 (9), Adler et al., Enzyme Synthesis of Glutamic acid.

Porter: Bacterial Chemistry and Physiology, Wiley, 1946, pages 575-578.

Sumner et al.: The Enzymes, Academic Press, 1952, vol. 2, part 2, pages 1116-1119.

Advances in Enzymology, vol. 15, 1954, pages 184-186, 224.